(12) United States Patent
Larry et al.

(10) Patent No.: US 9,927,642 B2
(45) Date of Patent: Mar. 27, 2018

(54) VEHICLE DISPLAY UNIT

(71) Applicant: Ford Global Technologies, LLC, Dearborn, MI (US)

(72) Inventors: Mark Larry, Macomb Township, MI (US); Mark Vincent Burns, Westland, MI (US); Tanmoy Joshi, Canton, MI (US); Patrick Badaru, Pulheim (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 197 days.

(21) Appl. No.: 14/743,049

(22) Filed: Jun. 18, 2015

(65) Prior Publication Data

US 2016/0368379 A1 Dec. 22, 2016

(51) Int. Cl.
*G02F 1/1333* (2006.01)
*B60K 35/00* (2006.01)

(52) U.S. Cl.
CPC ........ *G02F 1/133308* (2013.01); *B60K 35/00* (2013.01); *G02F 1/133385* (2013.01);
(Continued)

(58) Field of Classification Search
CPC .............. B60K 35/00; B60K 2350/946; B60K 2350/106; B60K 2350/925; B60K 37/06; B60K 37/00; B60K 37/02; B60K 2350/1024; B60K 2350/1028; B60K 2350/405; B60K 2350/941; B60K 2350/1072; G02F 1/133308; G02F 1/133385; G02F 2001/133314; G02F 2001/13332; G02F 1/133608; G02F 2001/133311; G02F 2001/133317; G02F 2001/133322; G02F 2001/133325; G02F 2001/133328; G02F 2001/133331; G02F 2001/133334; B60R 2011/0005; B60R 11/02; B60R 11/0235; B60R 11/0258;
(Continued)

(56) References Cited

U.S. PATENT DOCUMENTS 6,199,810 B1 * 3/2001 Wu ..................... B60R 11/0235
248/291.1
7,191,506 B2 3/2007 Gray
(Continued)

FOREIGN PATENT DOCUMENTS

CN 201423929 3/2010
DE 102011083022 A1 3/2013
(Continued)

OTHER PUBLICATIONS

English translation of KR 20150043918 A, Title: Display Apparatus for Vehicle, Author: Tae-Gyeong Yoon; Date of publication: Apr. 23, 2015.*

*Primary Examiner* — Edward Glick
*Assistant Examiner* — Shan Liu
(74) *Attorney, Agent, or Firm* — Frank A. MacKenzie; Bejin Bieneman PLC

(57) ABSTRACT

A display unit for a vehicle includes a screen module and a cover. A bracket supports the screen module and the cover. The bracket extends between the screen module and the cover and includes an attachment portion configured to engage the vehicle. The bracket also includes a heat sink adjacent the screen module for dissipating heat from the screen module during operation.

16 Claims, 7 Drawing Sheets

(52) U.S. Cl.
CPC .. *B60K 2350/106* (2013.01); *B60K 2350/925* (2013.01); *B60K 2350/941* (2013.01); *B60K 2350/946* (2013.01); *G02F 2001/13332* (2013.01); *G02F 2001/133314* (2013.01)

(58) Field of Classification Search
CPC ......... B60R 2011/0085; B60R 11/0252; B60R 2011/0075; B60R 2011/0094; B60R 7/06; G01C 21/265
See application file for complete search history.

(56) References Cited

U.S. PATENT DOCUMENTS

| | | | | |
|---|---|---|---|---|
| 7,650,230 B1 * | 1/2010 | Laverick | ................ | G01C 21/26 361/679.01 |
| 8,526,173 B2 | 9/2013 | Yokota | | |
| 2004/0233622 A1 * | 11/2004 | Schach | ................. | B60K 35/00 361/679.21 |
| 2006/0274488 A1 * | 12/2006 | Simmons | ............ | B60R 11/0235 361/679.26 |
| 2008/0012376 A1 * | 1/2008 | Gresham | ................ | B60K 37/00 296/37.12 |
| 2009/0127897 A1 * | 5/2009 | Watanabe | ............ | B60R 11/0235 297/188.04 |
| 2010/0188596 A1 * | 7/2010 | Juan | .................. | G02F 1/133308 349/58 |
| 2011/0248132 A1 * | 10/2011 | Hirota | .................. | H05K 7/1405 248/222.14 |
| 2011/0310543 A1 * | 12/2011 | Kim | .................. | G02F 1/133308 361/679.01 |
| 2012/0039091 A1 * | 2/2012 | Lee | ....................... | G06F 1/1601 362/633 |
| 2013/0093959 A1 * | 4/2013 | Yokawa | ........... | G02F 1/133615 348/725 |
| 2014/0022485 A1 * | 1/2014 | Kuo | .................. | G02F 1/133308 349/58 |
| 2014/0063369 A1 | 3/2014 | Hosorogiya | | |
| 2014/0185324 A1 * | 7/2014 | Noh | .................... | G02B 6/0085 362/633 |
| 2016/0131831 A1 * | 5/2016 | Tomomasa | ........... | G02B 6/0031 348/790 |

FOREIGN PATENT DOCUMENTS

| | | |
|---|---|---|
| JP | 2013052774 | 3/2013 |
| KR | 101396450 B1 | 5/2014 |
| KR | 20150043918 A * | 4/2015 |

* cited by examiner

VEHICLE DISPLAY UNIT

BACKGROUND

A vehicle, such as an automobile, may include one or more display units for displaying information and/or inputting information. One example is a display unit mounted to an instrument panel of the vehicle for displaying and/or receiving input for a navigation system, entertainment system such as radio, cell phone, etc., and/or a climate control system. The display unit may include an electronic visual display for displaying information and/or receiving input. The electronic visual display may include a touch panel, such as liquid crystal display (LCD) touch panel.

The instrument panel may include a frame and a covering. The display unit may be supported by the frame and may be embedded in the covering. In other words, a profile of the display unit may match a profile of the instrument panel.

Several factors provide constraints on the design of the display unit. For example, the shape of the instrument panel and other content supported on or in the instrument panel may place packaging constraints on the design of the display unit. The display unit may also include internal features that affect the size and shape of the display unit that may conflict with the packaging constraints of the instrument panel. For example, in the event that the display unit includes an LCD touch panel, the display unit may include heat sinks near the LCD touch panel to dissipate heat away from the LCD touch panel. In addition to these constraints, the display may be subject crash tests.

There remains an opportunity to design a display unit that satisfies these conflicting design requirements.

DETAILED DESCRIPTION

Figure 1:
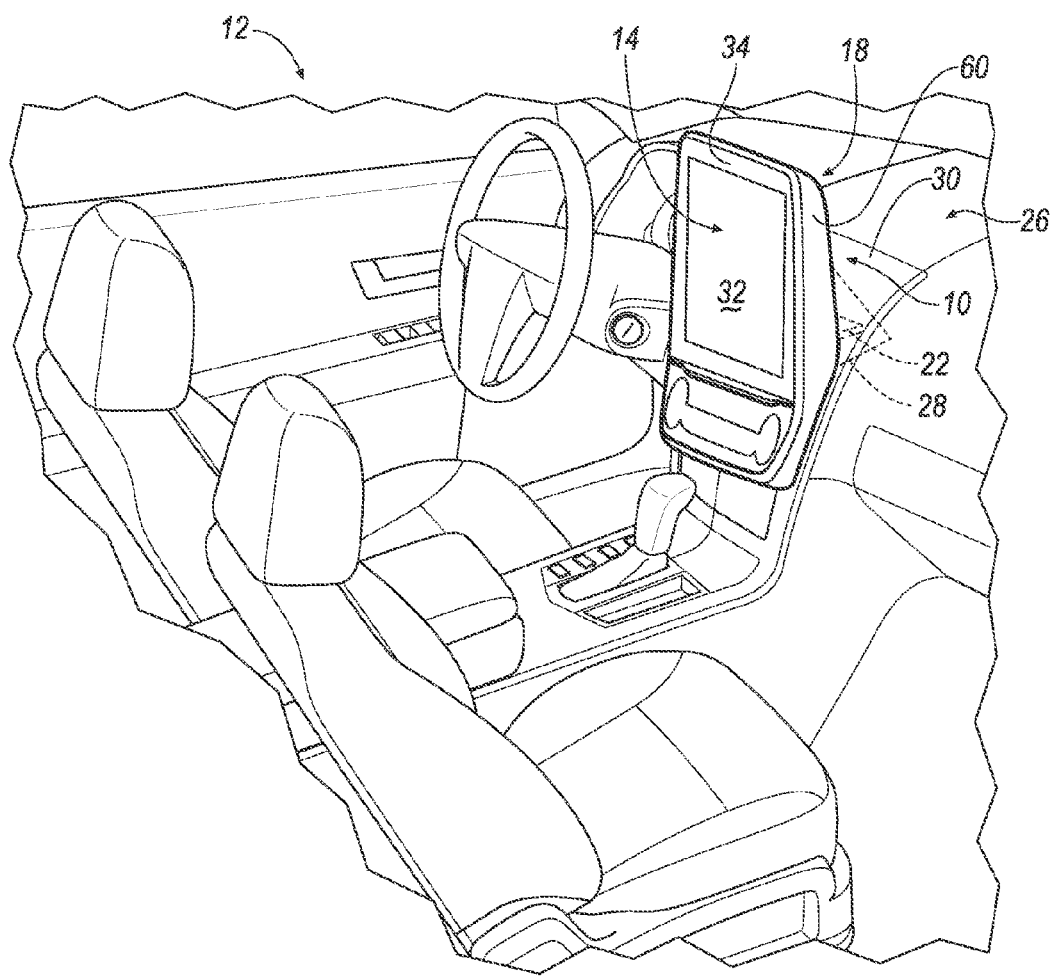
FIG. 1 is a perspective view of a display unit mounted to an instrument panel of a vehicle.

With reference to the Figures, wherein like numerals indicate like parts throughout the several views, a display unit 10 for a vehicle 12 is generally shown. The display unit 10 includes a screen module 14, a bracket 16 supporting the screen module 14, and a cover 18 supported by the bracket 16. The display unit 10 may include a frame 20 coupled to the screen module 14. The bracket 16 extends between the screen module 14 and the cover 18 and includes an attachment portion 22 configured to engage the vehicle 12. The bracket 16 also includes a heat sink 24 adjacent the screen module 14.

The bracket 16 performs several functions. The bracket 16 supports both the screen module 14 and the cover 18. In other words, as set forth further below, the bracket 16 provides structural support to both the screen module 14 and the cover 18. In addition, the bracket 16 engages the vehicle 12, e.g., an instrument panel 26 of the vehicle 12, as set forth further below, at the attachment portion 22 and, thus supports the screen module 14 and the cover 18 on the vehicle 12. The bracket 16 also includes the heat sink 24 adjacent the screen module 14 to dissipate heat away from the screen module 14, as set forth further below. Since the bracket 16 performs each of these functions, the bracket 16 allows for a reduction in the overall size, weight, and complexity of the display unit 10, thus accommodating packaging constraints of the vehicle 12, e.g., the instrument panel 26.

With reference to FIG. 1, the instrument panel 26 of the vehicle 12 includes a support 28 and a covering 30 on the support 28. The support 28 structurally supports the covering 30 and may be mounted to the vehicle 12, e.g., to a frame 20 and/or body of the vehicle 12. The support 28, for example, may be formed of metal and/or plastic. The covering 30 may cover the support 28 and provide an aesthetic appearance. Specifically, the covering 30 may present a class-A surface, i.e., a surface specifically manufactured to have a high quality, finished aesthetic appearance free of blemishes. The covering 30 may be formed of vinyl, foam, and/or plastic, etc.

Figure 2:
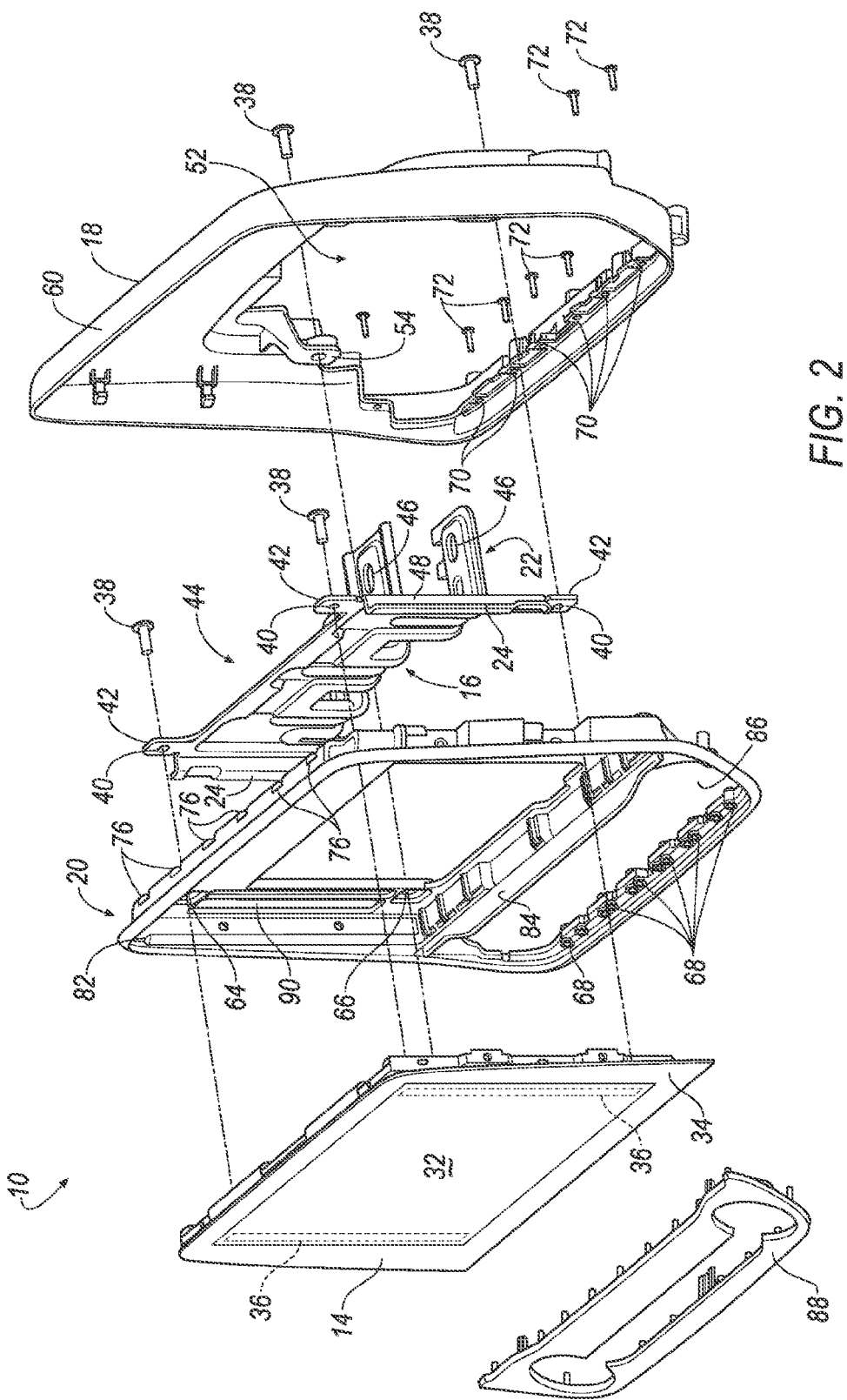
FIG. 2 is an exploded view of the display unit.

With reference to FIG. 2, the screen module 14 may include an electronic visual display 32, a bezel 34 surrounding the electronic visual display 32, and electronic components between the electronic visual display 32 and the bezel 34, e.g., circuit boards, wiring, etc.

With continued reference to FIG. 2, the electronic visual display 32 may, for example, be a liquid crystal display (LCD). The electronic visual display 32, e.g., the LCD, may include one or more light sources 36. For example, the light sources 36 may be one or more rows of light emitting diodes (LED). The light sources 36, e.g., the LEDs may be disposed adjacent the heat sink 24. As set forth further below, the light sources 36 may emit heat during operation and the heat sink 24 may dissipate heat away from the light sources 36.

The electronic visual display 32 may, alternatively, be of any suitable type, e.g., LED, OLED, plasma, etc. Further, the heat sink 24 of the bracket 16 may be adjacent any suitable heat emitting component of the electronic visual display 32 to dissipate heat therefrom.

With continued reference to FIGS. 2-5, the screen module 14, the cover 18, and the frame 20 may be supported by and mounted to the bracket 16. The bracket 16 may be disposed between the screen module 14 and the cover 18, as shown in FIG. 2. With continued reference to FIG. 2, the frame 20 may be disposed between the bracket 16 and the screen module 14.

Figure 3:
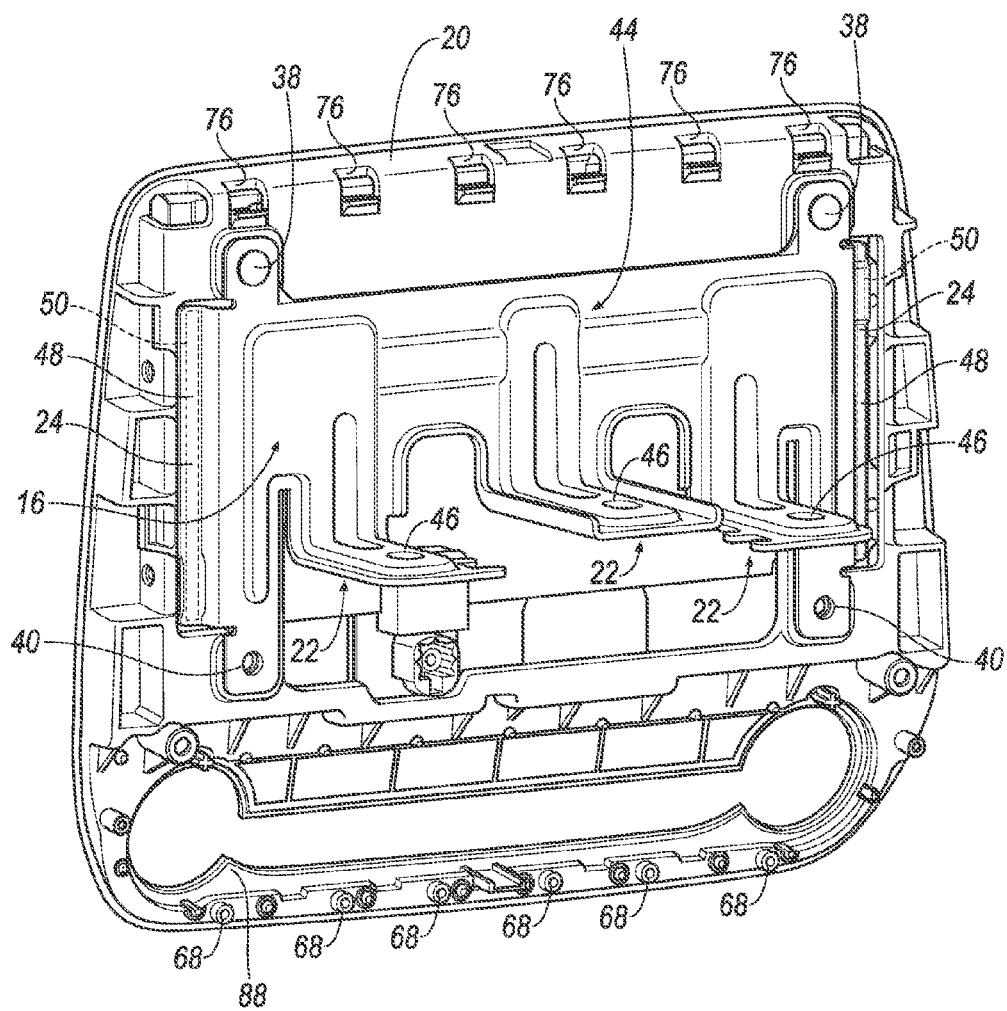
FIG. 3 is a perspective view of a portion of the display unit with a cover removed.
Figure 4:
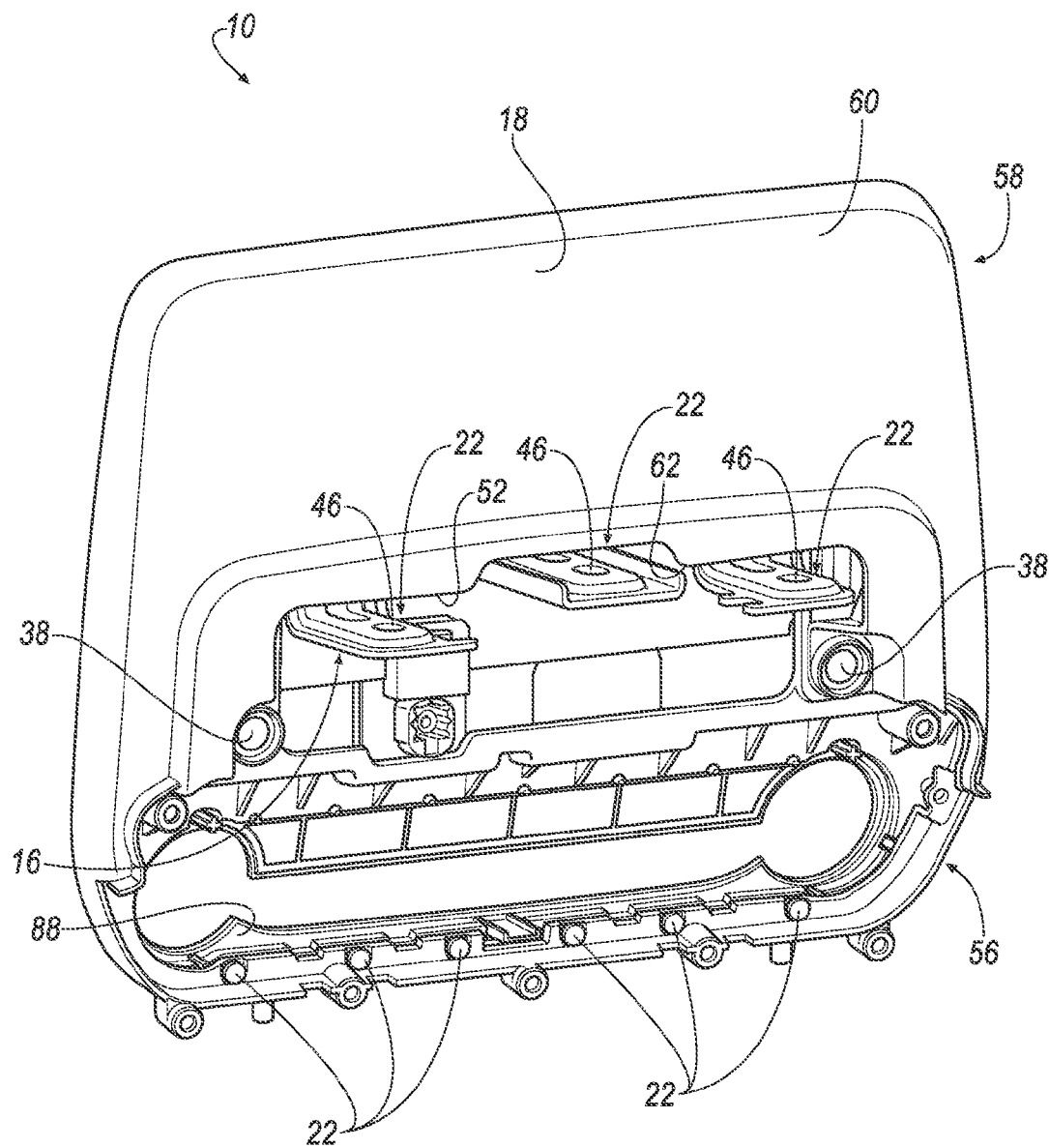
FIG. 4 is the perspective view of the display unit of FIG. 3 including the cover.

With continued reference to FIGS. 2 and 3, the display unit 10 may include at least one fastener 38 engaging the bracket 16 and the screen module 14. The fastener 38 may, for example, extend through the bracket 16 and through the frame 20 and may engage the screen module 14. The fastener 38 may be concealed between the screen module 14 and the cover 18, as shown in FIGS. 2 and 4. The display unit 10 in FIG. 2 includes four fasteners 38, however, the display unit 10 may include any suitable number of fasteners 38. The fasteners 38 may be of any suitable type, e.g., screws, clips, etc.

With reference to FIGS. 2 and 3, the bracket 16 may define holes 40 that receive the fasteners 38. The bracket 16 may, for example, define ears 42 and the holes 40 may be defined in the ears 42. The bracket 16 may include a plurality of ridges, ribs, etc. (not numbered), that may structurally reinforce the bracket 16.

With reference to FIGS. 2 and 3, the bracket 16 may include a base 44 and at least one attachment portion 22. The base 44 may be mounted to the screen module 14. The base 4 may be disposed between the screen module 14 and the cover 18 and may define the holes 40.

As shown in FIGS. 2 and 3, the bracket 16 may include a plurality of attachment portions 22 spaced from each other, e.g., three attachment portions 22 as shown in the Figures. The bracket 16 may include any suitable number of attachment portions 22.

Each attachment portion 22 may be configured to attach to the support 28 of the instrument panel 26. For example, as shown in FIGS. 2 and 3, each attachment portion 22 may define a hole 46 that receives a fastener (not shown) that engages the support 28 of the instrument panel 26. The fastener may be of any suitable type, e.g., screw, clip, etc. The attachment portion 22 may be shaped to match a shape of the support of the instrument panel 26.

The attachment portion 22 may extend transversely from the base 44. For example, as shown in the Figures, the attachment portion 22 may extend at a right angle relative to the base, e.g., at 90 degrees.

The base 44 and/or the attachment portion 22 may be configured to deform during impact, e.g., during a vehicle 12 collision, to absorb energy from an occupant of the vehicle 12 that impacts the display unit 10 during the vehicle 12 collision. The base 44 and/or the attachment portion 22 may deform at a bend between the base 44 and the attachment portion 22. The base 44 and/or the attachment portion 22 may be configured to resist permanent deformation when an occupant pulls or pushes the display unit 10, e.g., accidentally or purposefully, such as during ingress/egress. The base 44 and/or the attachment portion 22 may be of a size and shape to withstand deformation when pushed/pulled by an occupant and to deform to absorb energy when subjected to an impact of a predetermined magnitude, e.g., during a vehicle 12 collision.

With reference to FIGS. 2 and 3, the heat sink 24 includes a platform 48. As shown in FIG. 3, a thermal pad 50 may abut the platform 48 and the screen module 14, e.g., at or near the light source 36. The thermal pad 50 enhances surface contact between the platform 48 and the screen module 14 to encourage heat dissipation from the screen module 14 to the platform 48. The thermal pad 50 may be formed of any suitable material and may be mounted between the platform 48 and the screen module 14 in any suitable manner, e.g., sandwiched between and/or adhered to, etc. The heat sink 24 may include any suitable type of heat dissipation features, e.g., fins, waves, etc.

The bracket 16 may be a one-piece unit. For example, the base 44 and the attachment portions 22 of the bracket 16 may be integrally formed with each other, i.e., formed simultaneously as a single continuous unit.

The bracket 16 may be formed of any suitable material. For example, the bracket 16 may be formed of metal, e.g., steel, aluminum, etc. Alternatively, the bracket 16 may be formed of a polymeric material, e.g., nylon, sheet molding compound, etc.

Figure 5:
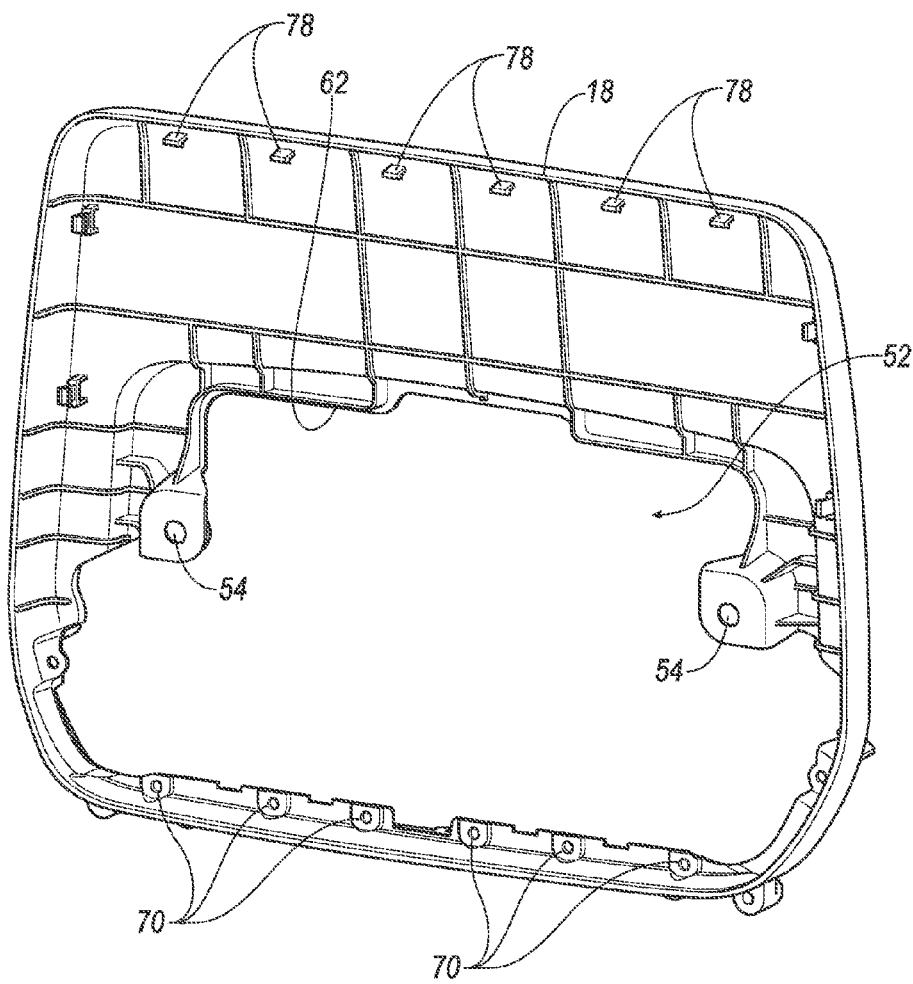
FIG. 5 is a perspective view of the cover.

With reference to FIGS. 2, 4, and 5, the cover 18 defines a cutout 52. As shown in FIG. 4, the attachment portion 22 of the bracket 16 extends through the cutout 52 to allow the attachment portion 22 to be mounted to the support of the instrument panel 26. As set forth above, cover 18 may conceal the fasteners 38 between the screen module 14 and the cover 18, as shown in FIG. 4.

With reference to FIGS. 4 and 5, the cover 18 may define one or more holes 54 for receiving the fasteners 38. As shown in FIG. 4, these fasteners 38 fasten the cover 18 to the bracket 16. As set forth above, these fasteners 38 that extend through the cover 18 also extend through the frame 20 and engage the screen module 14.

The display unit 10 may protrude upwardly from the covering 30 of the instrument panel 26, as shown in FIG. 1. Specifically, the display unit 10 includes a concealed portion 56 abutting the covering 30 and a housing portion 58 extending from the covering 30. As such, the housing portion 58 of the display unit 10 that protrudes upwardly from the covering 30 may leverage against the bracket 16 to bend the bracket 16 when a force above a predetermined magnitude is applied to the housing portion 58 of the display unit 10 that protrudes upwardly, e.g., during impact by an occupant of the vehicle 12 during a vehicle 12 collision.

The cover 18, specifically, may include an exposed portion 60 that protrudes from the covering 30 of the instrument panel 26, e.g., that protrudes upwardly from the covering 30. Once the cover 18 is engaged with the frame 20, as set forth further below, the exposed portion 60 conceals some of the fasteners 38. A periphery 62 of the cutout 52 (identified in FIG. 4) may abut the covering 30 of the instrument panel 26, as shown in FIG. 1. Specifically, the periphery 62 of the cutout 52 may abut the covering 30 of the instrument panel 26 when the attachment portion 22 of the bracket 16 is engaged with the instrument panel 26.

The attachment portion 22 of the bracket 16 may extend through the concealed portion 56 and engaging the frame 20. When the attachment portion 22 of the bracket 16 is engaged with the support of the instrument panel 26, the concealed portion 56 of the display unit 10 is concealed between the housing portion 58 of the display unit 10 and the covering 30 of the instrument panel 26. Wires, connections, etc., may extend through the cutout 52 of the cover 18 between the instrument panel 26 and the display unit 10 at the concealed portion 56 of the display unit 10. The cover 18, e.g., the exposed portion 60 of the cover 18 may present a class-A surface, i.e., a surface specifically manufactured to have a high quality, finished aesthetic appearance free of blemishes.

The cover 18 may be formed of any suitable material. For example, the cover 18 may be formed of a polymeric material, such as nylon, acrylonitrile butadiene styrene (ABS), vinyl, etc.

Figure 6:
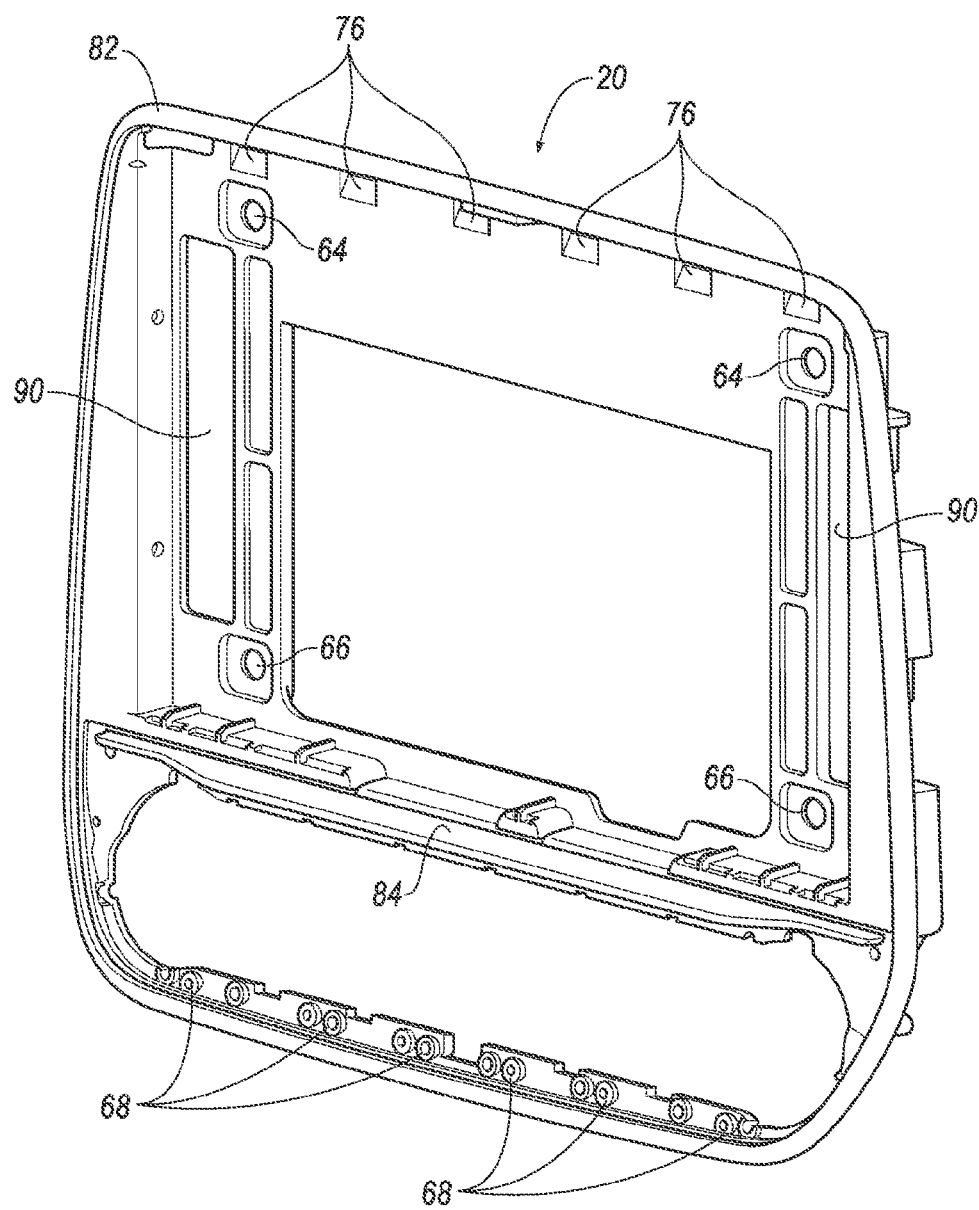
FIG. 6 is a perspective view of a frame of the display unit.
Figure 7:
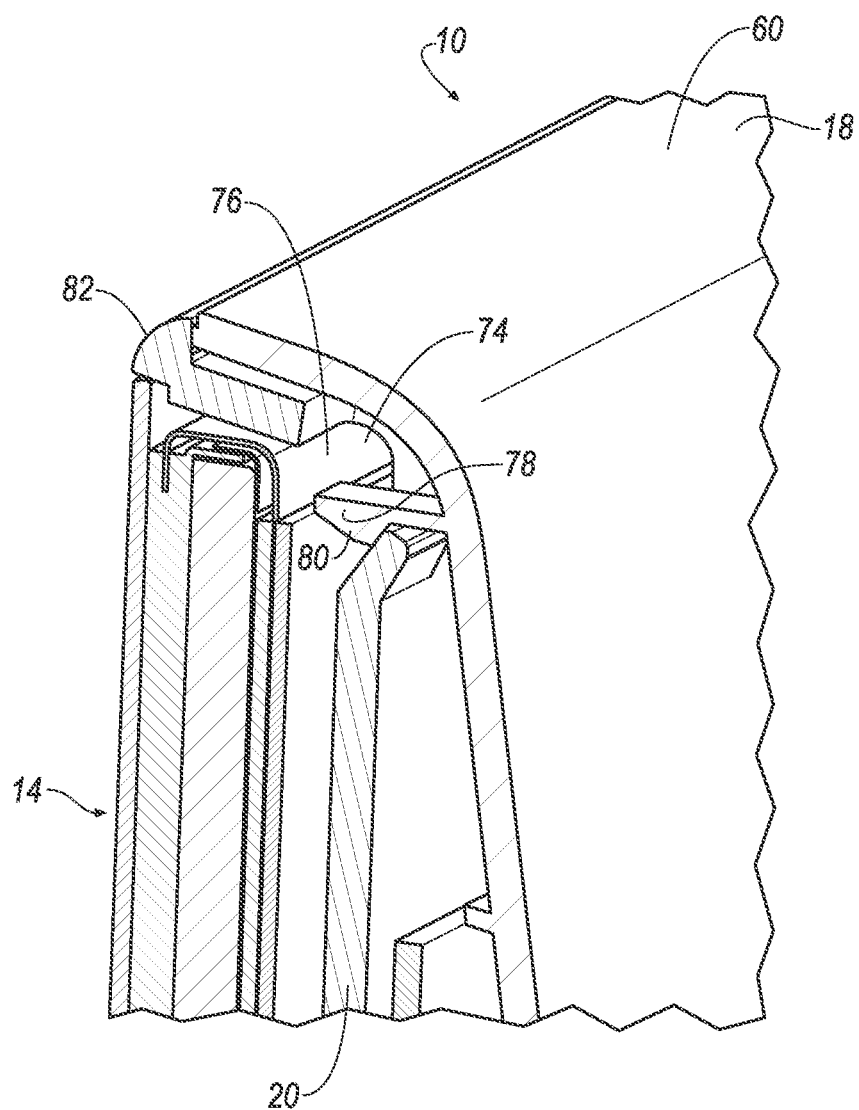
FIG. 7 is a cross-sectional view of the display unit.

With reference to FIGS. 6 and 7, as set forth above, the frame 20 is disposed between the bracket 16 and the screen module 14. The frame 20 is disposed between the bracket 16 and the screen module 14 and extends around at least a portion of a periphery 62 of the screen module 14

As shown in FIG. 6, the frame 20 may define holes 64, 66 for receiving the fasteners 38. Specifically, the frame 20 may define upper holes 64 and lower holes 66. The upper holes 64 receive fasteners 38 that extend through the bracket 16 and the frame 20 and engage the screen module 14. The fasteners 38 received in the upper holes 64 are concealed by the cover 18 when the cover 18 is assembled to the bracket 16 and the frame 20. The lower holes 66 receive fasteners 38 that extend through the cover 18, the bracket 16, and the frame 20 and engage the screen module 14.

The frame 20 and the cover 18 define aligned holes 68, 70 that receive fasteners 72 to engage the cover 18 to the frame 20. The holes 68, 70 and fasteners 72 are located at the concealed portion 56 of the display unit 10 such that the holes 68, 70 and fasteners 72 are concealed by the cover 18 and the covering 30 of the instrument panel 26 when the display unit 10 is engaged with the support 28 of the instrument panel 26. Specifically, the screen module 14 and the cover 18 may conceal a cavity 74 therebetween and the holes 68, 70 and fasteners 72 may be disposed in the cavity 74.

With reference to FIGS. 5-7, one of the cover 18 and the frame 20 defines notches 76 and the other of the cover 18 and the frame 20 presents clips 78 aligned with the notches 76. As shown in FIG. 7, when the cover 18 is assembled to the frame 20, the clips 78 engage the notches 76 to retain the cover 18 to the frame 20. As shown in FIGS. 5-7, for example, the cover 18 may present the clips 78 and the frame 20 may define the notches 76.

The clips 78 and the notches 76 are positioned along the housing portion 58, which, as set forth above, extends upwardly from the covering 30 of the instrument panel 26, and may be concealed by the cover 18. Specifically, the clips 78 and notches 76 may be disposed in the cavity between the cover 18 and the screen module 14. The fingers may present protrusions 80 for engaging the notches 76.

With reference to FIGS. 1-3, the frame 20 extend around at least a portion of a periphery of the screen module 14. The frame 20, for example, includes a bezel 82 that extends around the periphery of the screen module 14 to protect the screen module 14 and to cover 18 the periphery of the screen module 14, e.g., for support, and/or aesthetics, etc.

The frame 20 defines passages 90, as shown in FIG. 6. As shown in FIG. 3, the heat sinks 24 extend through the passages 90 when the bracket 16 is assembled to the frame 20. Specifically, the passages 90 are aligned with the light sources 36 such that the heat sinks 24 may directly abut the screen module 14 near the light sources 36 to dissipate heat away from the light sources 36.

The display unit 10 includes a shelf 84 cantilevered from the frame 20 below the screen module 14. The frame 20 may be formed of a first material and the shelf 84 may be formed from a second material different than the first material. The first material may be, for example, a platable plastic that shields electromagnetic interference (EMI) and/or radiofrequency interference (RFI). The second material may be, for example, a non-platable plastic. The non-platable plastic of the shelf may be covered with chrome. The bezel 82 of the frame 20 may be formed of the first material or the second material. The frame 20 and the shelf 84 may be integrally formed, i.e., formed simultaneously as a single continuous unit. For example, the frame 20 and the shelf 84 may be integrally formed by co-molding, e.g., two-shot injection molding.

As shown in FIG. 2, the frame 20 may include an opening 86 and a panel 88 fixed to the opening, e.g., with clips, fasteners, etc. The panel 88 may have features that support control instruments for controlling the screen module 14, e.g., buttons, knobs, input screens, etc.

In use, the bracket 16 may be engaged with the frame 20 and the screen module 14 with the fasteners 38. The cover 18 may then be assembled to the frame 20 by engaging the clips 78 with the notches 76 and engaging the fasteners 72 through the holes 68, 70. The cover 18 conceals any fasteners 38 that would otherwise have been visible along the housing portion 58. The attachment portion 22 of the bracket 16 may be engaged with the support 28 of the instrument panel 26.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A display unit for a vehicle, the display unit comprising:
   a screen module including an electronic visual display and a bezel surrounding the electronic visual display;
   a bracket supporting the screen module;
   a cover supported by the bracket;
   the bracket extending between the screen module and the cover and including an attachment portion configured to engage the vehicle, the cover defines a cutout and wherein the attachment portion extends through the cutout;
   a frame defining a cavity with the electronic visual display and the bezel disposed in the cavity, the frame being disposed between the bracket and the cavity and including a passage open to the cavity, the bracket including a heat sink extending through the passage and abutting the screen module;
   a fastener engaging the bracket and the screen module and extending through the frame between the bracket and the screen module; and
   the bracket includes a base mounted to the screen module, the attachment portion extending transversely from the base, wherein both the heat sink and the attachment portion are directly protruded from the base as a single piece of material.

2. The display unit as set forth in claim 1 wherein the base is disposed between the screen module and the cover.

3. The display unit as set forth in claim 1 wherein the fastener is concealed between the screen module and the cover.

4. The display unit as set forth in claim 1 wherein the frame extends around at least a portion of the periphery of the screen module.

5. The display module as set forth in claim 4 further comprising a shelf cantilevered from the frame below the screen module.

6. The display module as set forth in claim 5 wherein the frame is formed of a first material and the shelf is formed from a second material different than the first material, and wherein the frame and the shelf are integrally formed.

7. The display unit as set forth in claim 1 wherein the cover presents a class-A surface.

8. The display module as set forth in claim 1 wherein the screen module includes a liquid crystal display including a light source, and wherein the passage and the heat sink are aligned with the light source.

9. The display module as set forth in claim 8 wherein the light source is elongated along an axis, and wherein the passage and the heat sink are elongated along the axis.

10. The display module as set forth in claim 9 wherein the light source is an elongated row of light emitting diodes.

11. The display module as set forth in claim 1 wherein the heat sink includes a platform and further comprising a thermal pad abutting the platform and the screen module.

12. The display unit as set forth in claim 1, wherein the frame is between the bezel and the bracket.

13. An instrument panel comprising:
   a support;
   a display unit including a bracket mounted to the support and the bracket including an attachment portion configured to engage a vehicle;
   the display unit including a screen module and a cover each mounted to the bracket with the bracket disposed between the screen module and the cover, the screen module including an electronic visual display and a bezel surrounding the electronic visual display, the cover defines a cutout and wherein the attachment portion extends through the cutout;
   a frame disposed between the bracket and the screen module and including a passage, the bracket including a heat sink extending through the passage and abutting the screen module, the frame defining a cavity with the electronic visual display and the bezel disposed in the cavity, the frame being disposed between the bracket and the cavity and the passage being open to the cavity; and the bracket includes a base mounted to the screen module, the attachment portion extending transversely from the base, wherein both the heat sink and the attachment portion are directly protruded from the base as a single piece of material.

14. The instrument panel as set forth in claim 13 wherein the instrument panel includes a covering on the support and wherein the cover of the display unit includes a housing portion abutting the covering and a free portion extending from the covering.

15. The instrument panel as set forth in claim 14 wherein the attachment portion extends through the housing portion and engaging the frame.

16. The instrument panel as set forth in claim 15 wherein the frame and the screen module define the cavity therebetween and are connected to each other in the cavity.

* * * * *